United States Patent [19]

Schultz

[11] Patent Number: 4,569,851

[45] Date of Patent: Feb. 11, 1986

[54] METHOD FOR TOASTING A BAKERY PRODUCT

[76] Inventor: George A. Schultz, 176 Ohio Ave., New Braunfels, Tex. 78130

[21] Appl. No.: 705,997

[22] Filed: Feb. 27, 1985

Related U.S. Application Data

[62] Division of Ser. No. 504,871, Jun. 16, 1983, Pat. No. 4,508,025.

[51] Int. Cl.[4] .............................................. A21D 8/06
[52] U.S. Cl. .................................... 426/496; 426/523
[58] Field of Search ........................ 426/523, 496, 512; 99/353, 395, 423, 443 C, 448; 198/406, 407, 410, 603; 432/142

[56] References Cited

U.S. PATENT DOCUMENTS

| | | | |
|---|---|---|---|
| 1,869,539 | 8/1932 | Brand | 99/423 |
| 2,696,377 | 12/1954 | Gouner | 432/142 |
| 2,830,529 | 4/1958 | Jaffe | 99/423 |
| 2,986,103 | 5/1961 | Flores | 99/423 |
| 3,111,913 | 11/1963 | Mladek et al. | 99/353 |
| 3,223,053 | 12/1965 | Jimenez et al. | 99/423 |
| 3,397,655 | 8/1968 | Valadez et al. | 99/353 |
| 3,425,364 | 2/1969 | Martin, Jr. | 432/142 |
| 3,457,853 | 7/1969 | Morley | 99/423 |
| 3,905,757 | 9/1975 | von Dreusche, Jr. | 432/142 |
| 4,228,133 | 10/1980 | Lindroos et al. | 432/142 |
| 4,241,648 | 12/1980 | Longenecker | 99/443 C |

*Primary Examiner*—George Yeung
*Attorney, Agent, or Firm*—Gunn, Lee & Jackson

[57] ABSTRACT

A compact tortilla press and oven unit. The press delivers formed tortillas to the oven wherein they are toasted on a plurality of rotating oven discs. The tortilla is initially received by a first oven disc upon which a first side of the tortilla is partially toasted. Upon completion of one revolution of the first oven disc, the tortilla is removed therefrom by a first scraper. A second rotating oven disc adjacent to and in vertical alignment with the first oven disc receives the tortilla on a second side thereof by means of a slide intermediate to the first and second discs. The slide receives the tortilla upon removal thereof from the first disc and allows the tortilla to turn over and be placed upside down on the adjacent disc. Upon completion of one revolution of the second disc, upon which the second side of the tortilla has been partially toasted, the tortilla is removed therefrom by a second scraper. The toasting of each side of the tortilla is completed in a similar sequence by a third and fourth rotating disc in vertical alignment with the first and second discs. The method for toasting a tortilla within the oven comprises the steps of toasting a first side of the tortilla on a first rotating disc, translating the tortilla from the first disc to a second rotating disc, and toasting a second side of the tortilla on the second disc.

5 Claims, 11 Drawing Figures

METHOD FOR TOASTING A BAKERY PRODUCT

This is a divisional of co-pending application Ser. No. 504,871, filed on June 16, 1983, now U.S. Pat. No. 4,508,025.

BACKGROUND OF THE INVENTION

Although tortillas have long been considered a tasty and nutritious food product, their popularity has increased dramatically in recent years. The preparation of a tortilla typically involves bulk mixing of the tortilla dough, dividing the dough into balls of dough of equal proportions, forming a round tortilla from the ball of dough, and toasting or baking the tortilla. Furthermore, each step in this process typically requires a separate piece of equipment. As illustrated by the prior art discussed hereinbelow, various types of apparatus have been designed for the purpose of forming and heating a tortilla shaped product.

The present invention provides a compact, tortilla press and oven unit which divides the dough, forms a tortilla therefrom, and thereafter toasts each side of the formed tortilla at least once. The tortilla press forms a tortilla from a ball or portion of dough received from a depositor and delivers the formed tortilla to the oven wherein it is toasted. The oven comprises a plurality of horizontal toasting discs in vertical alignment and rotatable about a vertical shaft. The formed tortilla is initially received by a first or uppermost oven disc upon which a first side of the tortilla is partially toasted. Upon completion of one revolution of the first disc with the tortilla thereon, the tortilla is removed therefrom by a first fixed scraper. A second rotatable oven disc beneath the first oven disc thereafter receives the tortilla from the first disc by means of a fixed slide intermediate to the first and second discs. The fixed slide receives the tortilla from the first disc after it is removed therefrom by the first fixed scraper and allows the tortilla to flip or turn over, thereby allowing the second disc to receive and partially toast the second side of the tortilla. Upon completion of one revolution of the second disc with the tortilla thereon, the tortilla is removed therefrom by a second fixed scraper. The toasting of the first and second sides of the tortilla is thereafter preferably completed by a third and fourth oven disc, respectively, which are in vertical alignment with the first and second discs. The toasting of the tortilla is completed in a similar fashion as described hereinabove prior to the removal thereof from the fourth disc by a fourth fixed scrapper. The toasted tortilla is thereafter received by an exit conveyor and removed from the oven.

The method for toasting a tortilla within the invention oven comprises the steps of toasting a first side of the tortilla on a first rotatable disc, removing the tortilla from the first disc by means of a fixed scraper, allowing the tortilla to turn over by means of a fixed slide, and toasting a second side of the tortilla on a second rotatable disc. The process may thereafter be repeated using a third and fourth rotatable disc in order to assure complete toasting of each side of the tortilla. The invention press and oven is able, therefore, to provide a compact unit wherein a tortilla may be formed and thereafter toasted in a fixed sequence by a plurality of rotatable discs.

BRIEF DESCRIPTION OF THE PRIOR ART

Various types of apparatus for forming and heating a food product are disclosed in the prior art. For example, U.S. Pat. No. 3,457,853 issued to Morley, discloses a cooking element in the form of a disc for cooking hamburger patties as the cooking element rotates about a vertical axis. The hamburger meat is initially pressed by a roller and thereafter cooked within an enclosed cooking zone beneath a shroud before being scraped from the cooking element by a cutter blade. Morley does not disclose a means for turning the hamburger patties over during the cooking process; in fact, Morley emphasizes that the hamburger patties adhere tightly and remain stuck to the cooking surface throughout the cooking period. Furthermore, Morley does not teach the use of a plurality of oven discs for toasting a food product or a means for allowing the food product to pass from one oven disc to another.

U.S. Pat. No. 3,111,913 issued to Mládek, et al., discloses the use of a roller for forming bakery products, which are thereafter turned upside down upon dropping from one of a plurality of superposed conveying belts to the next within a cooled proofing chamber. The bakery products are subsequently heated in an oven which is separated from the proofing chamber by a ventilating space having a blower at one end and an air-discharge port at the other. The formed bakery products are allowed to pass between an upper and lower belt within the oven by means of a tiltable tray but are not turned over during the baking process. Nevertheless, Mládek et al., does not disclose a plurality of rotatable oven discs for toasting a tortilla thereon or a means for removing the tortilla from a disc upon rotation thereof. Furthermore, Miládek, et al. does not disclose a means for allowing the tortilla to be turned over and received by another disc during the toasting thereof.

Various types of apparatus have also been designed for the purpose of simultaneously forming and heating a tortilla. For example, U.S. Pat. No. 3,397,655 issued to Valadez, et al., U.S. Pat. No. 4,241,648 issued to Longenecker, and U.S. Pat. No. 3,223,053 issued to Jimenez, et al. all disclose apparatus wherein a tortilla is simultaneously formed and heated. Furthermore, U.S. Pat. No. 4,241,648 issued to Longenecker discloses a scraper for removing a heated tortilla from the outer surface of a cylindrical roll. Nevertheless, the patents to Valadez, et al., Longenecker, and Jimenez, et al. do not disclose the formation and subsequent toasting of a tortilla. Furthermore, none of the patents discussed herein disclose the use of a plurality of rotatable oven discs for sequentially toasting opposite sides of a tortilla or a means for translating the tortilla from one oven disc to another.

SUMMARY OF THE INVENTION

It is a primary object of the present invention to provide a compact tortilla oven.

It is another object of the present invention to provide a single unit tortilla press and oven.

It is still another object of the present invention to provide a tortilla oven wherein both sides of a tortilla may be toasted on a plurality of rotating discs.

It is a further object of the present invention to provide a tortilla oven wherein a tortilla is removed from a first disc upon rotation thereof and thereafter received by a second disc adjacent to and in vertical alignment with the first disc.

It is yet a further object of the present invention to provide a tortilla oven wherein a tortilla may be translated from a first toasting state on a first disc to a second toasting state on a second disc.

It is a still further object of the present invention to provide a method for sequentially toasting opposite sides of a tortilla utilizing the oven disclosed herein.

These and other objects as well are achieved in the present invention by providing a compact tortilla press and oven unit. The tortilla press of the invention unit receives a portion of dough from a depositor and forms a tortilla therefrom between a fixed lower compression plate and an upper compression plate capable of vertical movement with respect to the lower plate. The formed tortilla is thereafter delivered to the oven and a new dough portion is simultaneously placed between the plates by a transverse tortilla scraper which moves between the compression plates. The oven comprises a plurality of horizontal oven discs in vertical alignment and rotatable about a common shaft. The oven discs are preferably heated by a plurality of gas burners located beneath the respective discs. The formed tortilla from the press is initially received by a first or uppermost oven disc upon which a first side of the tortilla is partially toasted. Upon completion of one revolution of the first oven disc with the tortilla thereon, the tortilla is removed therefrom by a first scraper which is contiguous to the first disc and fixed to the oven frame. The tortilla is removed or urged off the disc as a result of the tortilla's contact with the tortilla scraper and the simultaneous rotation of the disc.

A second rotatable oven disc adjacent to and in vertical alignment with the first rotatable oven disc receives the torilla from the first disc by means of a slide fixed to the oven frame intermediate to the first and second discs. The fixed slide receives the tortilla from the first disc and allows the tortilla to turn over or upside down on the second disc, with respect to its former position on the first disc, thereby permitting the second disc to partially toast the second side of the tortilla. The scraper and slide thus combine to translate the tortilla from its toasting state on the first disc on which the first side thereof is toasted to its toasting state on the second disc on which the second side thereof is toasted.

Upon completion of one revolution of the second disc with the tortilla thereon, the tortilla is removed therefrom by a second scraper which is contiguous to the second disc and fixed to the oven frame. The toasted tortilla is thereafter received and removed from the oven by a conveyor in proximity with the second disc or received by a second fixed slide intermediate to the second disc and a third rotatable disc. In the latter event, the toasting procedure described hereinabove is repeated by the third disc, a third fixed scraper, a fourth rotatable oven disc, a third fixed slide intermediate to the third and fourth discs, and a fourth fixed scraper. The fully toasted tortilla may thereafter be removed from the oven as described hereinabove.

The method for toasting a tortilla within the invention oven comprises the steps of rotating and heating a first disc, toasting a first side of the tortilla on the first disc and translating the tortilla from the first rotating disc to a second disc adjacent to and in vertical alignment with the first disc. The method for toasting a tortilla further comprises the steps of rotating and heating the second disc, toasting a second side of the tortilla on the second disc, and removing the tortilla from the second disc. The method may also comprise the additional steps of toasting one or more sides of the tortilla on one or more rotatable oven discs and translating the tortilla therebetween, as described hereinabove.

The invention tortilla press and oven unit permits the sequential toasting of opposite sides of a formed tortilla by translating the tortilla from one rotatable disc to another in vertical alignment therewith. The tortilla press and oven unit further provides a compact unit wherein a tortilla may be formed, toasted, and discharged in a continuous process.

DETAILED DESCRIPTION OF THE PREFERRED EMBODIMENT

Figure 1:
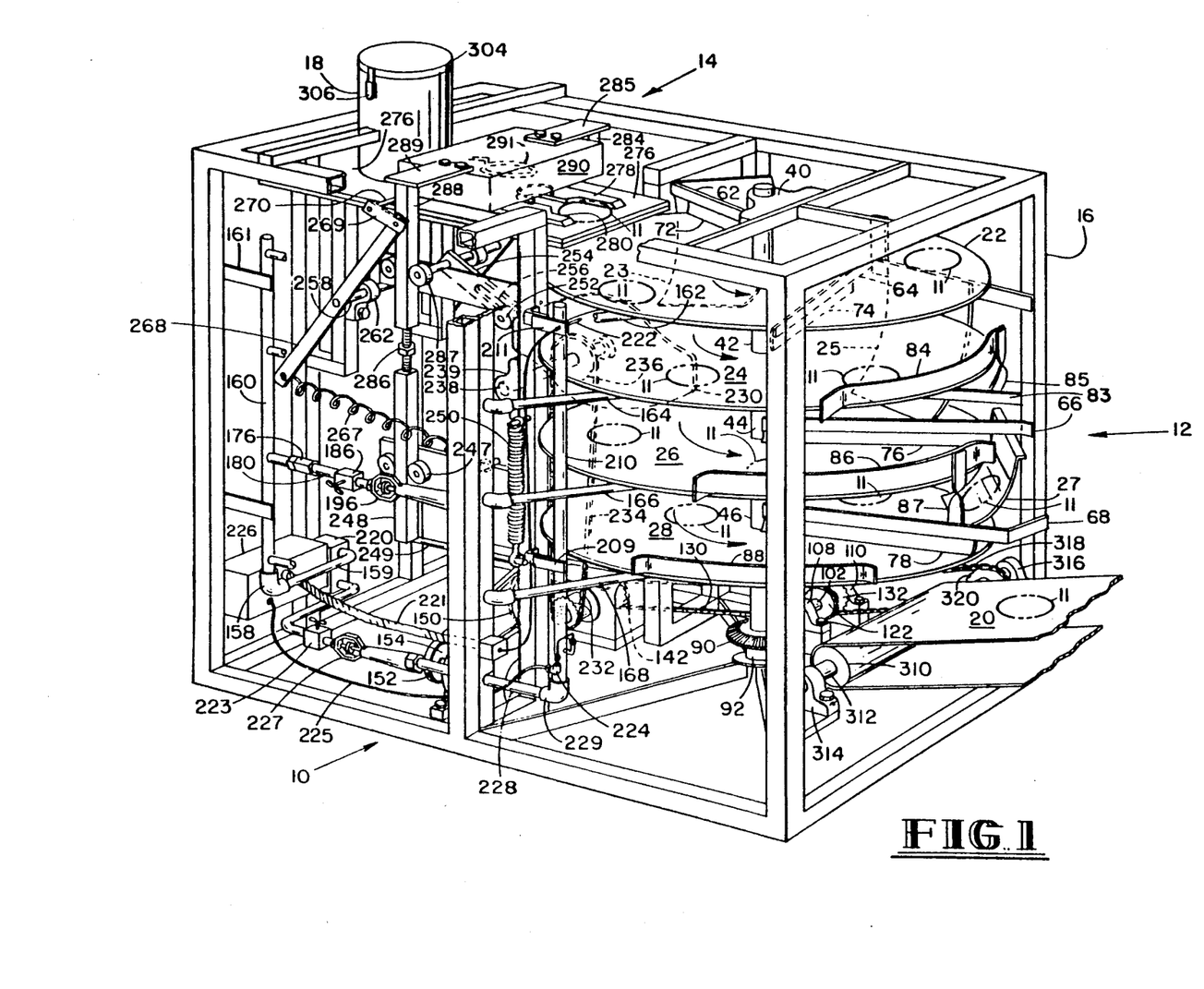
FIG. 1 is a perspective view of the invention tortilla press and oven unit.

Referring to FIG. 1, the invention tortilla press and oven unit is identified by the number 10. The unit 10 is designed to form and toast a plurality of tortillas 11 and comprises a tortilla oven 12 and tortilla press 14 supported by frame 16. A dough depositor 18 is appropriately mounted to frame 16 in proximity with the press 14. A conveyor system having a belt 20 is also preferably connected to frame 16 in proximity with the oven 12. The unit 10 is preferably housed within a plurality of external panels (not shown) and preferably has an external control box (not shown) mounted thereto.

Figure 2:
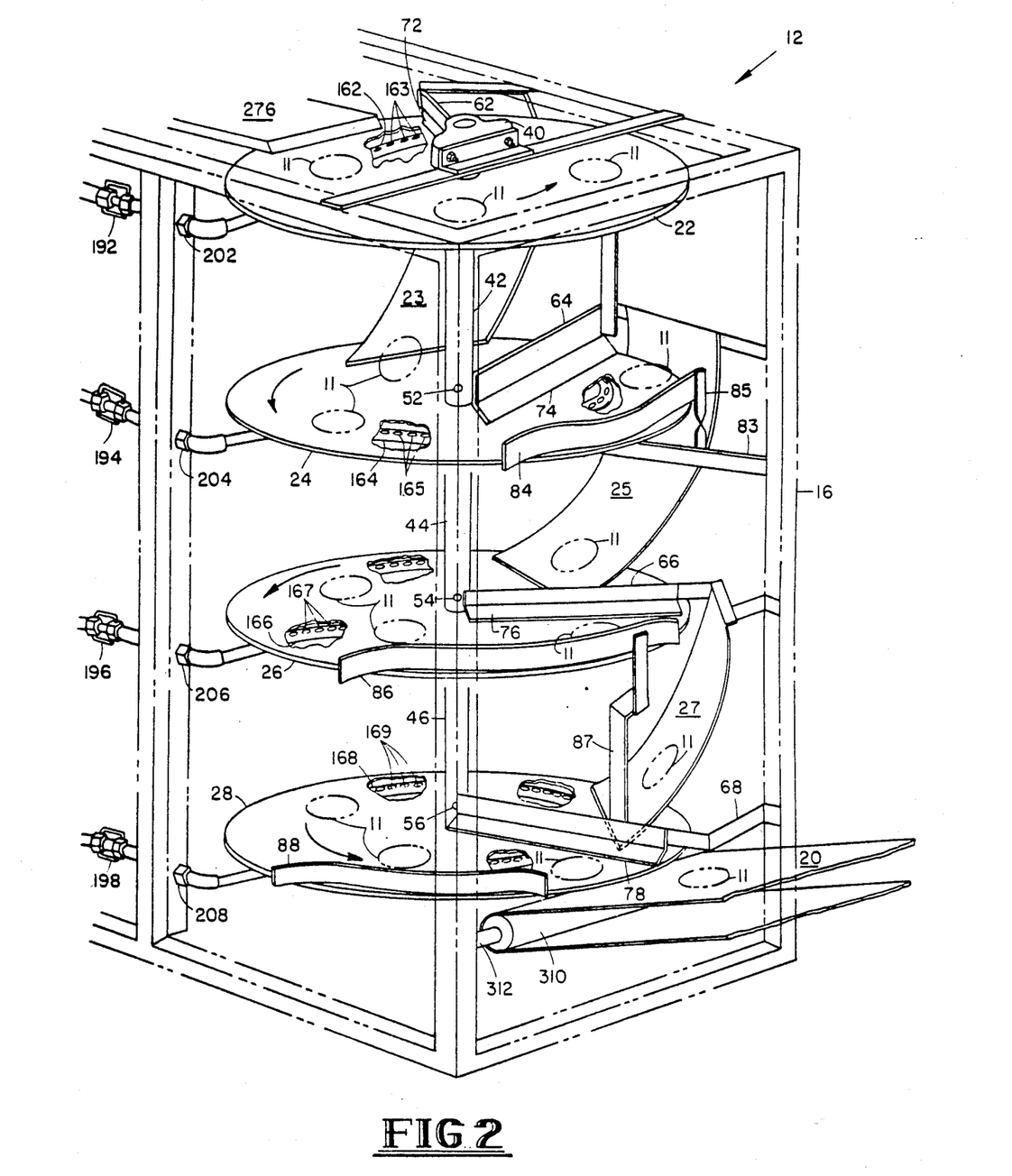
FIG. 2 is a perspective view of the invention tortilla oven.
Figure 3:
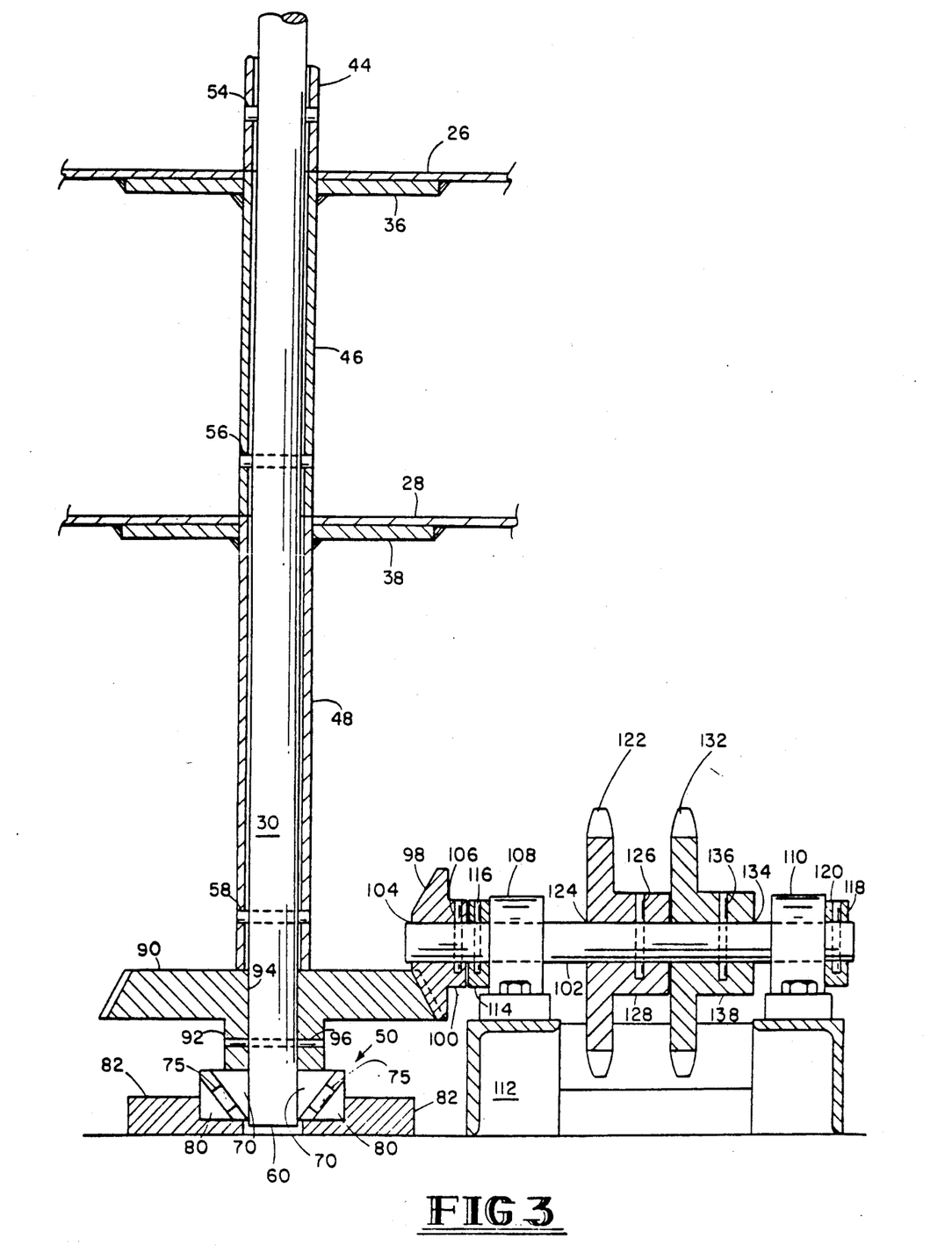
FIG. 3 is a cross-sectional view of the drive shaft and drive mechanism for the tortilla oven.

As illustrated in FIG. 1, FIG. 2 and FIG. 3, the invention oven 12 comprises a plurality of horizontal oven discs 22, 24, 26, and 28 rotatable about a vertical drive shaft 30. Oven discs 22, 24, 26, and 28 are preferably metal and have a diameter of approximately twenty inches. A plurality of metal support plates 32, 34, 36, and 38 are welded or otherwise connected to horizontal oven discs 22, 24, 26, and 28, respectively, beneath the respective discs. A plurality of hollow annular tubes 42, 44, 46, and 48 extend through the central bore of oven discs 22, 24, 26, and 28, respectively, and are welded or otherwise secured to support plates 32, 34, 36, and 38, respectively. As explained more fully hereinbelow, a plurality of curved tortilla slides 23, 25 and 27 are connected to frame 16 intermediate to discs 22-24, 24-26, and 26-28, respectively.

The vertical drive shaft 30 is secured to the top of frame 16 by a pillow block bearing 40 and has a lower end 60 which extends through a roller bearing 50 secured to the bottom of frame 16 by a machined plate 82. Annular tubes 42, 44, 46, and 48 are each secured about the drive shaft 30 by a plurality of removable pins 52, 54, 56, and 58, respectively, which extend through the shaft 30 and the respective tube. The lower end of oven disc tubes 42, 44, and 46 (opposite the respective oven discs) rests on the upper (oven disc) end of the tube immediately therebelow while the lower end of oven disc tube 48 (opposite oven disc 28) rests on bevel gear 90. Tubes 42, 44, 46, and 48 rotate simultaneously upon rotation of drive shaft 30 and thereby rotate oven discs 22, 24, 26, and 28, respectively. It is to be understood, therefore, that annular tubes 42, 44, and 46 provide the spacing between oven discs 22-24, 24-26, and 26-28, respectively, and that each oven disc is independent and can be readily removed from drive shaft 30 by removing the pin from the respective tube.

A plurality of fixed scrapers 62, 64, 66, and 68 are mounted to frame 16 above oven discs 22, 24, 26, and 28, respectively. Fixed scrapers 62, 64, 66, and 68 preferably have a flexible horizontal border 72, 74, 76, and 78, respectively, affixed thereto, the respective borders having a lower edge in contact with the upper surface of rotatable oven discs 22, 24, 26, and 28, respectively. The oven 12 is also provided with a plurality of tortilla guides 84, 86, and 88 which keep the tortillas 11 on the respective oven discs during the rotation thereof. Tortilla guide 84 on the outer periphery of oven disc 24 is preferably connected to heating element support 83 by guide extension 85. Tortilla guide 86 on the outer periphery of oven disc 26 is connected to fixed scraper 68 by guide extension 87. Finally, tortilla guide 88 on the outer periphery of oven disc 28 is appropriately connected to frame 16. It is to be understood that first oven disc 22 may also be provided with a tortilla guide, if necessary, and that the tortilla guides may be secured in any appropriate fashion and be placed about the periphery of the respective oven discs in any desirable location.

As illustrated in FIG. 3, the lower end 60 of vertical drive shaft 30 extends through the inner race 70 of tapered roller bearing 50. The roller bearing 50 comprises a plurality of rollers 75 mounted between the inner race 70 and outer race 80. Roller bearing 50 is supported within the machined plate 82 which is properly secured to frame 16.

A bevel gear 90 having an annular base 92 rests on the inner race 70 of tapered bearing 50. The drive shaft 30 extends through the central bore 94 of bevel gear 90 and is secured to base 92 by a pin 96 extending therethrough. A right angle drive gear 98 having a base 100 is secured about a horizontal drive shaft 102 and is in mating engagement with bevel gear 90. The horizontal drive shaft 102 is secured within the bore 104 of right angle drive gear 98 by a pin 106 which extends through right angle drive gear base 100 and horizontal drive shaft 102. The horizontal drive shaft 102 is also secured within a pair of pillow block bearings 108 and 110 appropriately secured to base 112. An inner pillow block collar 114 is secured to drive shaft 102 between inner bearing 108 and right angle drive gear base 100 by a pin 116 which extends through collar 114 and drive shaft 102. Likewise, an outer pillow block collar 118 is secured to drive shaft 102 on the outside of outer bearing 110 by a pin 120 which extends through collar 118 and drive shaft 102. It is to be understood that the mating engagement of right angle drive gear 98 with bevel gear 90 in the desired gear ratio will cause bevel gear 90 and vertical drive shaft 30 to rotate upon rotation of horizontal drive shaft 102.

A pair of sprockets 122 and 132 are secured to the horizontal drive shaft 102 between inner bearing 108 and outer bearing 110. Drive shaft 102 extends through the inner bore 124 of inner sprocket 122 and is secured therein by a pin 126 which extends through the base 128 of inner sprocket 122 and drive shaft 102. Likewise, drive shaft 102 extends through the inner bore 134 of outer sprocket 132 and is secured therein by a pin 136 which extends through the base 138 of outer sprocket 132 and drive shaft 102.

Figure 4:
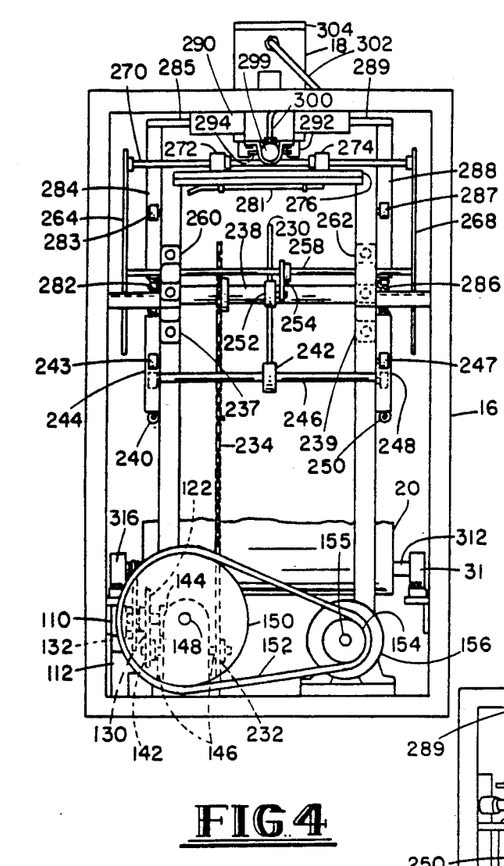
FIG. 4 is a rear plan view of the press portion of the tortilla press and oven unit.
Figure 5:
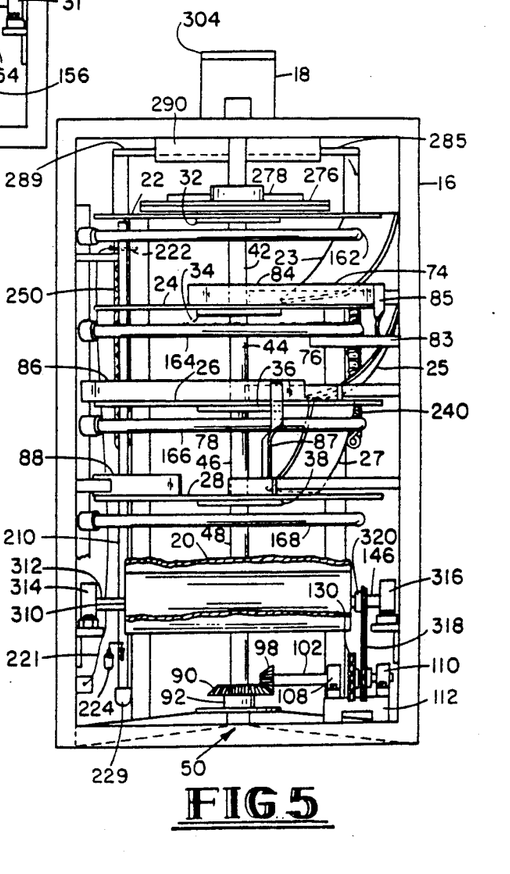
FIG. 5 is a front plan view of the oven portion of the tortilla press and oven unit.
Figure 6:
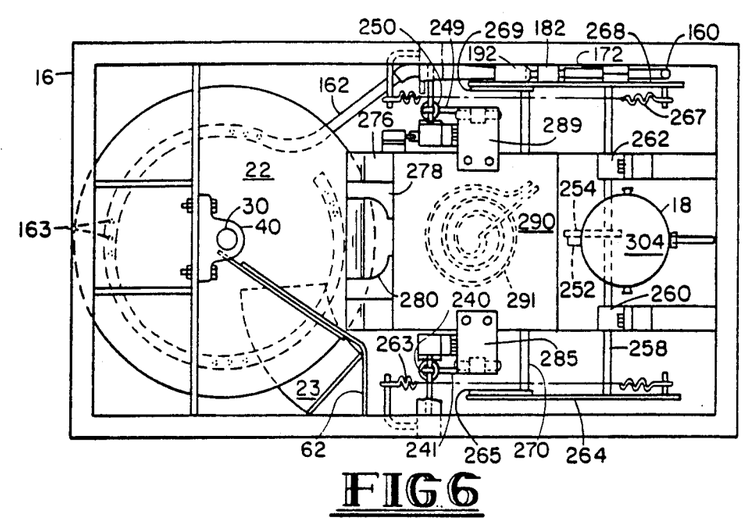
FIG. 6 is a top plan view of the tortilla press and oven unit.
Figure 7:
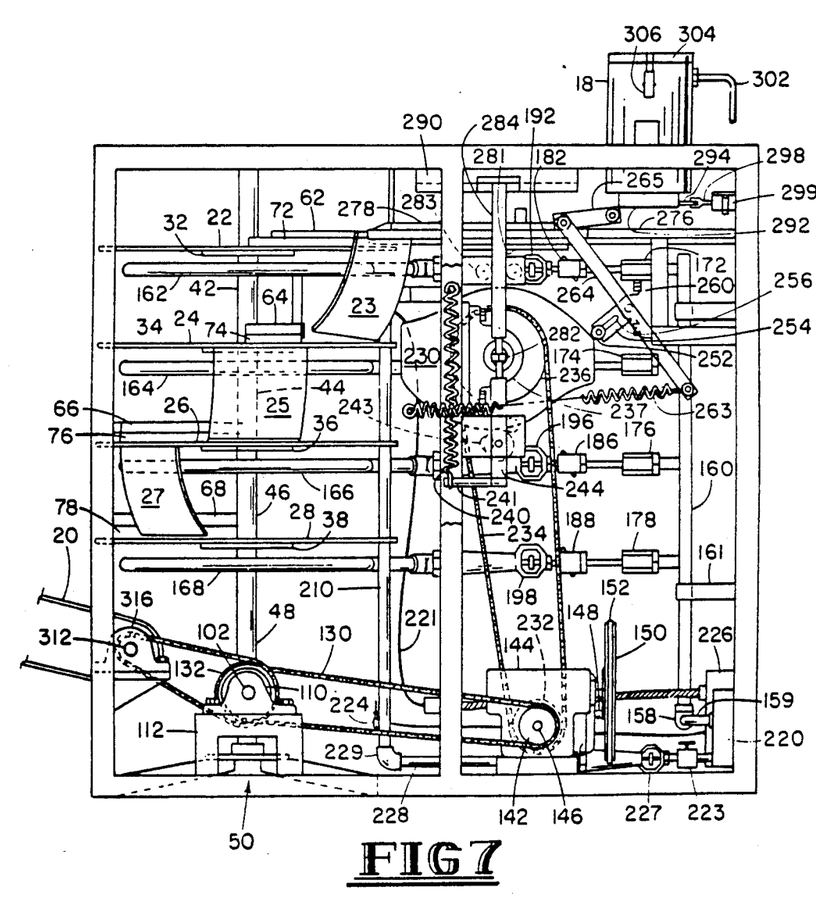
FIG. 7 is a plan view of a first side of the tortilla press and oven unit.

As illustrated in FIG. 1, FIG. 4, and FIG. 7, an oven drive chain 130 is secured about inner sprocket 122 and the outer sprocket 142 of a gear box 144. Outer gear box sprocket 142 is properly secured to a gear box drive shaft 146 which extends through the center thereof and gear box 144. An inner gear box sprocket 232 is also properly secured to gear box drive shaft 146 and rotated thereby. Gear box drive shaft 146 is rotated or driven within gear box 144 by drive wheel shaft 148 and a gear box drive wheel 150 which is properly secured thereto. Gear box drive wheel 150 is driven by a motor 156 having a motor drive shaft 155 which extends through the center of a motor drive wheel 154 and is secured thereto. A gear box drive belt 152 is secured about rotatable gear box drive wheel 150 and rotatable motor drive wheel 154. As motor 156 rotates motor drive shaft 155 and motor drive wheel 154, gear box drive belt 152 rotates gear box drive wheel 150, thereby driving gear box drive shaft 146 and rotating outer sprocket 142 and inner sprocket 232.

Figure 8:
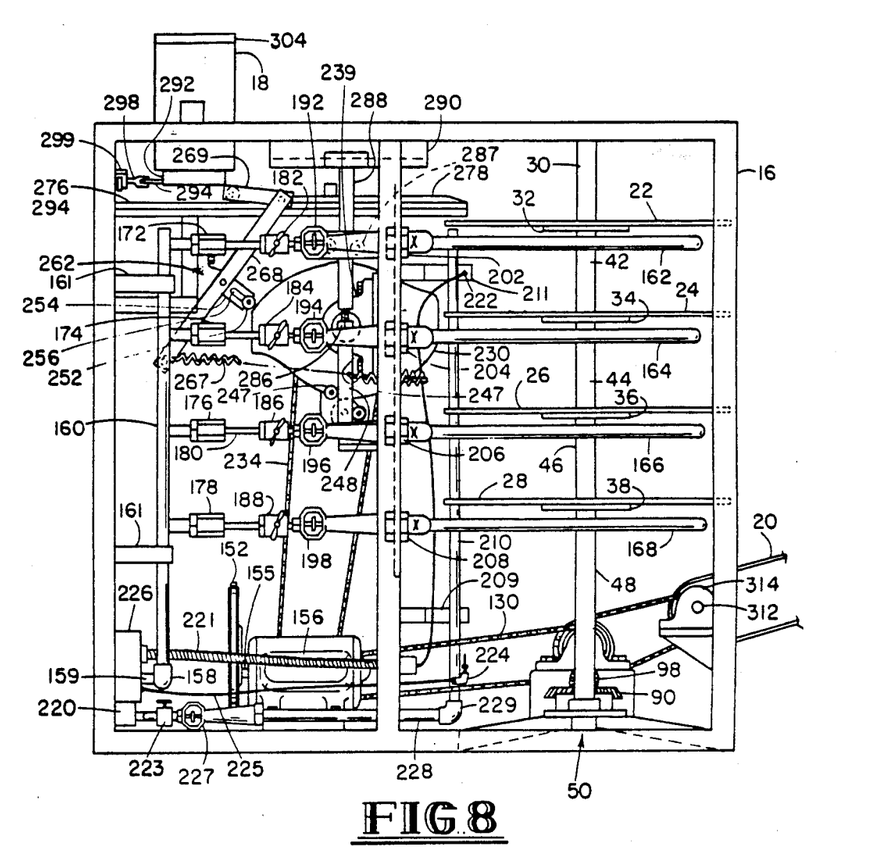
FIG. 8 is a plan view of a second side of the tortilla press and oven unit.

Rotatable oven discs 22, 24, 26, and 28 are preferably heated by a plurality of gas burners 162, 164, 166, and 168, respectively, which are curled immediately below their respective oven discs. Burners 162, 164, 166, and 168 have a plurality of burner orifices 163, 165, 167, and 169, respectively, properly spaced along the length thereof, for emitting a gas flame therefrom. Gas burners 162, 164, 166, and 168 are preferably supported by a plurality of heating element supports (similar to heating element support 83) which are connected to frame 16 and are preferably constructed of standard black pipe. As illustrated in FIG. 8, gas burners 162, 164, 166, and 168 are connected to a common gas manifold 160 which is connected to frame 116 by a pair of manifold supports 161. Gas manifold 160 is connected to a dual gas control valve 220 by manifold fitting 158 and tubing 159. A plurality of tubing fittings 172, 174, 176, and 178 are connected to gas supply manifold 160 and appropriately spaced along the length thereof. Fittings 172, 174, 176, and 178, are attached to a plurality of key gas stops or gas flow valves 182, 184, 186, and 188, respectively, which, in turn, are attached to a plurality of air injector valves 192, 194, 196, and 198, respectively. The respective fittings, key gas stops, and air injector valves are connected by sufficient gas tubing 180 between gas supply manifold 160 and gas burners 162, 164, 166, and 168, respectively. A plurality of pipe union fittings 202, 204, 206, and 208 permit the attachment and ready removal of gas burners 162, 164, 166, and 168, respectively.

As illustrated in FIG. 1 and FIG. 8, a vertical pilot tree 210 having a length of approximately thirty inches is connected to frame 16 by supports 209 and 211. A plurality of orifices (not shown) extend between the pilot tree 210 and the respective burners 162, 164, 166, and 168, thereby permitting combustion within the respective gas burners by means of the flame which extends the length of the pilot tree 210. The pilot tree 210 is also connected to dual gas control valve 220 and is provided with a flame switch 222 which is connected thereto on the uppermost portion thereof. The flame switch 222 is connected to a power box or ignition module 226 by flame switch power line 221. The pilot tree 210 is also provided with a flame ignition sensor 224 which is connected to ignition module 226 by flame sensor power line 225. Intermediate to pilot tree 210 and dual gas control valve 220 is a key gas stop or gas flow valve 223, an air injector valve 227, and a pilot tree fitting 229, all of which are connected by sufficient gas tubing 228. As explained more fully hereinbelow, dual gas control valve 220 has a pilot valve and a gas manifold valve located therein and is in electrical contact with ignition module 226. It is to be understood that the gas heating system described herein is merely illustrative of numerous possible embodiments for heating oven discs 22, 24, 26, and 28, and that oven discs 22, 24, 26, and 28 may, for example, be heated by utilizing resistance heater elements located therein or in proximity therewith.

The press portion 14 of the invention tortilla press and oven unit 10 is illustrated most clearly in FIG. 4, FIG. 6, FIG. 7, and FIG. 8. The press 14 comprises a cam 230 driven by a cam chain 234 secured about inner gear box sprocket 232 and cam sprocket 236. A rotatable cam shaft 238 is attached to and aligned through the center of cam 230 and cam sprocket 236. The opposite ends of cam shaft 238 are secured to frame 16 within a pair of pillow block bearings 237 and 239.

The periphery of cam 230 is in continuous contact with a press follower 242 and an adjustable slide follower 252. A horizontal press rod 246 is attached to and aligned through the center of press follower 242 and secured on opposite ends thereof to a first pair of vertical arms 244 and 248. Slide follower 252 is secured to a first horizontal slide rod 258 by a slide rod extension 254 having a groove 256 therein for adjusting the position thereon of the slide follower 252. First horizontal slide rod 258 is rotatable and is secured to frame 16 through a pair of pillow block bearings 260 and 262. The opposite ends of first slide rod 258 are connected to a pair of slide arms 264 and 268 in approximately the center thereof. A pair of extensions 265 and 269 are connected on a first end thereof to the upper ends of slide arms 264 and 268, respectively. A pair of compression springs 263 and 267 are each connected on a first end thereof to the lower ends (opposite extensions 265 and 269) of slide arms 264 and 268, respectively, and on a second end thereof to the forward end (toward oven 12) of frame 16.

A second horizontal slide rod 270 is connected on opposite ends thereof to a second end of extensions 265 and 269. Slide rod 270 extends through the center of and is supported by a pair of rollers 272 and 274 which rest on a lower horizontal compression plate 276. A tortilla scraper 278 having a tortilla pocket 280 therein is also secured to second slide rod 270 and likewise rests on the upper surface of fixed lower compression plate 276. Rollers 272, 274 and the underside of tortilla scraper 278 are preferably coated with Teflon resin to permit smooth movement on compression plate 276. A lower resistance heater coil 281 is connected immediately beneath lower compression plate 276 on the forward end thereof. It is to be understood that the tension in springs 263 and 267 will urge the lower ends of slide arms 264 and 268 forward (toward the oven portion 12), thereby urging the second slide rod 270 and the tortilla scraper 278 rearward (away from the oven portion 12) on compression plate 276. It is also to be understood that the rotation of first slide rod 258, as determined by the rotation of cam 230 and the adjusted position of slide follower 252, will determine the extent of the forward motion of tortilla scraper 278 on compression plate 276.

An adjustable turnbuckle 282 connects first vertical arm 244 with second vertical arm 284. Likewise, an adjustable turnbuckle 286 connects first vertical arm 248 with second vertical arm 288. Extension arms 285 and 289 connect the uppermost portion of second vertical arms 284 and 288, respectively, to upper compression plate 290. Upper compression plate 290 is also provided with an upper resistance heater element 291 which is located therein or on the top thereof. First vertical arms 244 and 248 are each received between a pair of lower roller guides 243 and 247, respectively, which are secured to frame 16. Second vertical arms 284 and 288 are each received between a pair of upper roller guides 283 and 287, respectively, which are also secured to frame 16. A first vertical compression spring 240 is connected on a first end thereof to the uppermost portion of frame 16 and on a second end thereof to a spring extension 241 which is connected to first vertical arm 244. A second vertical compression spring 250 is also connected on a first end thereof to the uppermost portion of frame 16 and on a second end thereof to a spring extension 249 which is connected to first vertical arm 248. It is to be understood that the connection of a first end of tensioned springs 240 and 250 to frame 16 above spring extensions 241 and 249, respectively, urges upper compression plate 290 upward. It is also to be understood that the extent of upward or downward vertical motion of upper compression plate 290 can be varied by adjusting turnbuckles 282 and 286.

Figures 9, 10:
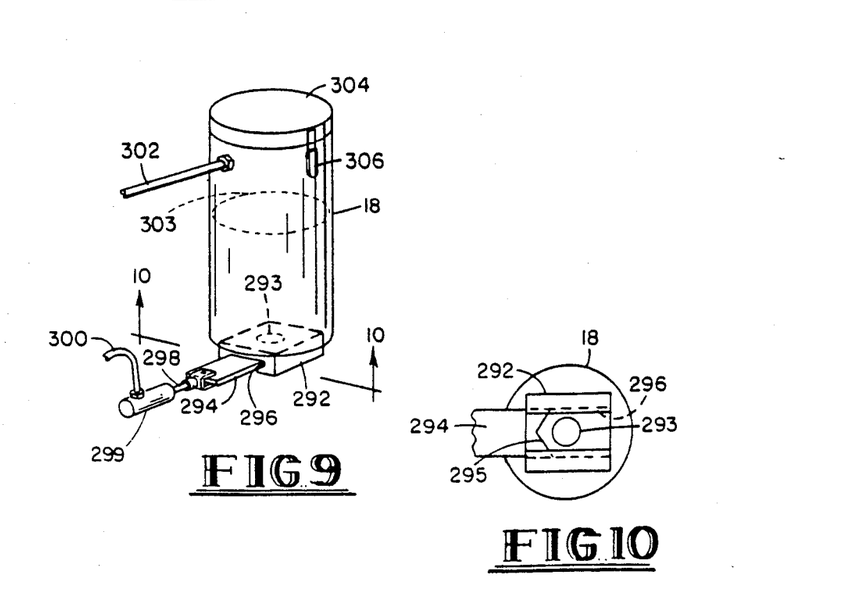
FIG. 9 is a perspective view of the dough depositor and dough divider mechanism for the tortilla press and oven unit.
FIG. 10 is a cross-sectional view of the dough depositor and divider along section lines 10—10 of FIG. 9.

As illustrated most clearly in FIG. 8, FIG. 9 and FIG. 10, the invention tortilla press and oven unit 10 is also provided with a cylindrical dough depositor 18, which is mounted to frame 16 above the rearward end of lower compression plate 276. The depositor 18 is mounted atop an extruder block 292 which is adapted to receive a cutting blade 294 by means of a groove 296 therein. The cutting blade 294 preferably has a "V" shaped edge 295 and is secured within the groove 296 of extruder block 292 by a cylinder arm 298 which is attached to blade 294. Cylinder arm 298 and blade 294 are activated by air cylinder 299 which receives compressed air from pressure line 300.

An air pressure line 302 is also attached to the upper portion of depositor 18. After the dough or other tortilla ingredients (not shown) is inserted into the depositor 18, a floating disc 303 is placed on the top of the dough and the lid 304 is closed and secured by latch 306. Air pressure from line 302 thereafter urges the dough on the bottom of depositor 18 outward through orifice 293. The timed activation of cutting blade 294 separates a desired portion of dough from the depsitor 18 and allows the dough portion to fall therefrom onto the rearward end of compression plate 276 and be received within tortilla pocket 280 of tortilla scraper 278. The cutting blade 294 is therefter withdrawn from orifice 293 and the timed deposit of an appropriate dough portion on the rearward end of compression plate 276 is repeated.

As illustrated in the several drawings, a conveyor belt 20 is secured about a conveyor drum 310 and driven by a conveyor drive shaft 312. Conveyor drive shaft 312 is secured within pillow block bearings 314 and 316, which are secured to frame 16 on the opposite sides of drum 310. The conveyor drive shaft 312 is driven by a conveyor drive chain 318 which is secured about outer sprocket 132 and conveyor drive sprocket 320. The conveyor belt 20 receives the completely toasted tortillas 11 from bottom oven disc 28 and delivers them to a desired location for removal and subsequent consumption.

Figure 11:
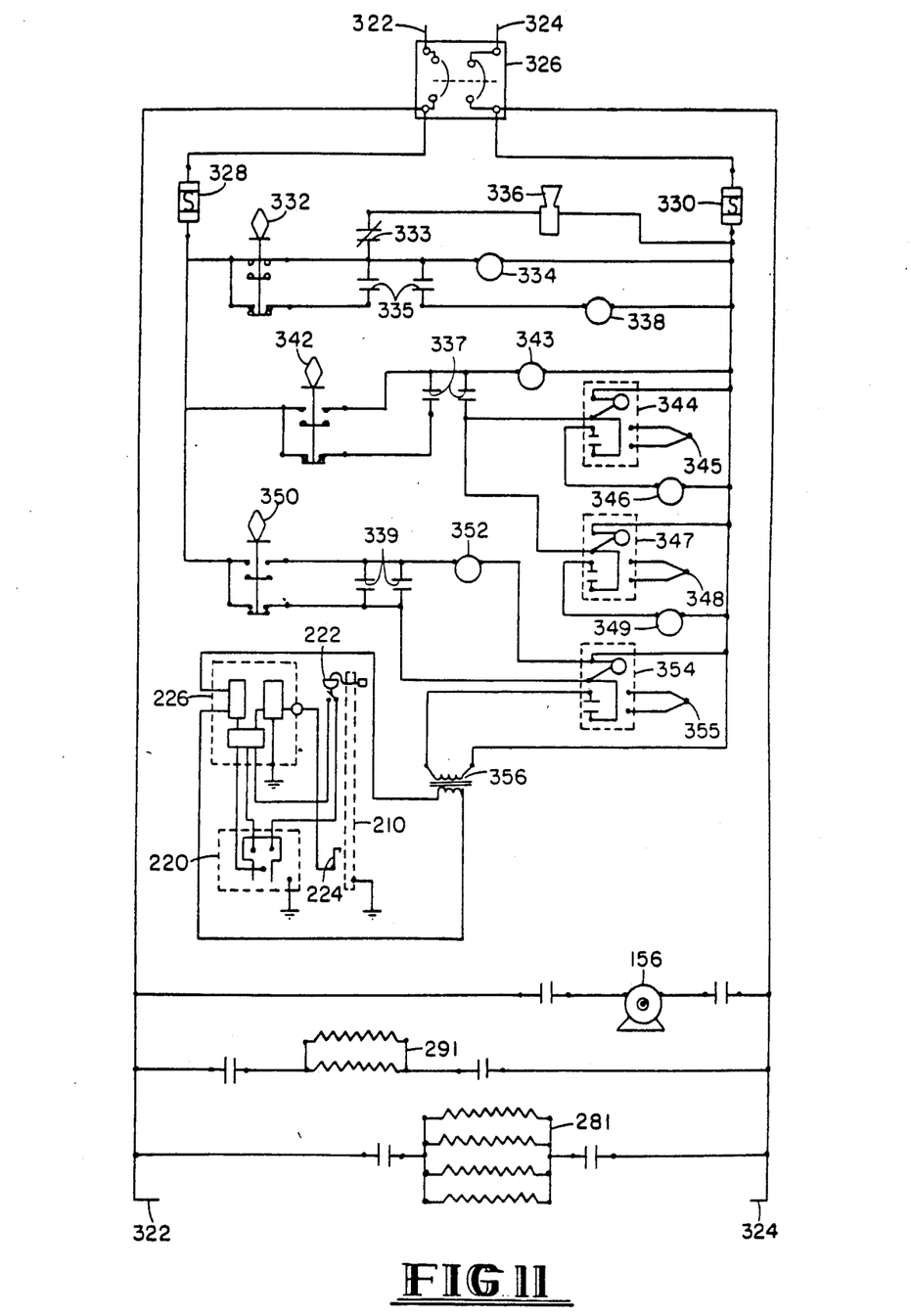
FIG. 11 is an electrical schematic diagram for the tortilla press and oven unit.

In the preferred embodiment, the invention tortilla press and oven 10 is operated in accordance with the electrical schematic diagram illustrated in FIG. 11. The circuit utilized in the invention tortilla press and oven 10 comprises power lines 322, 324, a circuit breaker 326, and a pair of fuses 328, 330. The circuit is further provided with a push/pull press operator 332, a push/pull resistance heater element operator 342, a push/pull oven operator 350, and two pairs of capacitors 337, 339. When the push/pull press operator 332 is pulled, a press control relay 334 in cooperation with a timed open 333 and timed close 335 permit the initial activation of a horn 336 which sounds for approximately four seconds before motor contactor coil 338 activates motor 156.

When push/pull resistance heater operator 342 is pulled, resistance heater control relay 343 permits the activation of top heater contact 344 having a thermocouple 345 and top heater coil 346, which top heater contact 344 and top heater coil 346 energize upper resistance heater element 291. Resistance heater control relay 343 also permits the activation of bottom heater contact 347 having a thermocouple 348 and bottom heater coil 349, which bottom heater contact 347 and bottom heater coil 349 energize lower resistance heater element 281.

When push/pull oven operator 350 is pulled, oven control relay 352 permits the activation of oven contact 354 having a thermocouple 355. Oven contact 354 energizes transformer 356 and thereby permits the operation of dual gas control valve 220 and ignition module 226. When ignition module 226 is energized, the flame sensor 224 will ignite and thereby cause or signal the pilot valve within gas control valve 220 to open. When the pilot valve within control valve 220 is open, gas will flow from an appropriate supply (not shown) to the pilot tree 210, and flame sensor 224 will ignite the gas within the length of pilot tree 210. Once the pilot tree 210 is lit, the flame switch 222 senses the resultant flame at the top of pilot tree 210 and opens the gas manifold valve within control valve 220. When the gas manifold valve within control valve 220 is open, gas will flow from an appropriate supply to the manifold 160 and burners 162, 164, 166, and 168. The pilot tree 210 thereafter ignites the gas within burners 162, 164, 166, and 168 through the respective orificies therebetween, the respective gas burners thereby heating oven discs 22, 24, 26, and 28 through burner orificies 163, 165, 167, and 169, respectively.

When push/pull operators 332, 342, and 350 are pulled and tortilla dough is placed within the hopper 18, the invention tortilla press and oven unit 10 will operate in accordance with the following description. The motor 156 will drive gear box drive belt 152 and rotate gear box drive wheel 150, thereby rotating outer gear box sprocket 142 and inner gear box sprocket 232. The rotation of outer gear box sprocket 142 drives oven drive chain 130 and thereby rotates horizontal drive shaft 102. The mating of right angle drive gear 98 and bevel gear 90 (preferably a 2:1 gear ratio) and the simultaneous rotation of drive shaft 102 rotates vertical drive shaft 30 and oven discs 22, 24, 26, and 28. Motor 156 is preferably one-half horsepower and oven discs 22, 24, 26, and 28 preferably rotate at a rate of approximately 5 RPM. This rate allows the toasting of approximately five hundred tortillas per hour.

The rotation of inner gear box sprocket 232 drives cam chain 234 and thereby rotates cam 230. When the major diameter of cam 230 is in contact with press follower 242, press rod 246 is urged downward. The downward motion of press rod 246 urges upper compression plate 290 and arms 244, 284 and 248, 288 downward against the upward pull of springs 240 and 250, respectively. The proper adjustment of turnbuckles 282 and 286 further permits the desired downward motion of upper compression plate 290 in contact or proximity with the forward end of lower compression plate 276. It is to be understood that when the major diameter of cam 230 is in contact with press follower 242, the minor diameter of cam 230 will be in contact with slide follower 252, thereby allowing first slide rod 258 to rotate, and springs 263 and 267 will cause the lower ends of arms 264 and 268, respectively, to move forward (toward oven 12) and thereby rotate first slide rod 258. The forward motion of the lower ends of arms 264 and 268 will cause second slide rod 270 and tortilla scraper 278 to move to the rearward end of lower compression plate 276 beneath depositor 18.

When cam 230 rotates and the minor diameter thereof is in contact with press follower 242, upper compression plate 290 will be urged upward by springs 240 and 250. At the same time, the major diameter of cam 230 will be in contact with slide follower 252 and will cause first slide rod 258 to rotate, thereby causing the lower ends of arms 264 and 268 to move rearward (away from oven 12). The rotation of first slide rod 258 causes second slide rod 270 and tortilla slide 278 to move to the forward end of lower compression plate 276 beneath upper compression plate 290. Thus, the continuous rotation of cam 230 results in the alternating vertical motion of upper compression plate 290 towards and away from the forward end of lower compression plate 276. The continuous rotation of cam 230 also results in the alternating horizontal or transverse motion of tortilla scraper 278 to the forward and rearward end of lower compression plate 276.

Throughout the operation of the invention oven 10, gas burners 162, 164, 166, and 168 continuously heat metal oven discs 22, 24, 26, and 28, respectively. In the unlikely event that the flame is lost within the pilot tree 210, flame switch 222 will close the gas manifold valve within control valve 220, thereby prohibiting the flow of gas to manifold 160 and burners 162, 164, 166, and 168. Furthermore, the pilot valve will close unless the flame sensor 224 is ignited. Finally, the gas manifold valve will not open until the flame sensor 224 ignites the gas within pilot tree 210 and flame switch 222 senses the resultant flame. The flame switch 222 and flame sensor 224 thus provide a safety check against the unwanted release of gas from the invention tortilla press and oven unit 10.

Resistance heater elements 281 and 291 also continuously heat the forward end of lower compression plate 276 (beneath upper compression plate 290) and upper compression plate 290, respectively. The heating of compression plates 276 and 290 assists in the formation and subsequent removal of the tortilla 11. It is to be understood that the electrical system operating the various components of the invention tortilla press and oven unit 10, as diagrammed in FIG. 11, is merely illustrative and various semiconductor or microcomputer components may also be utilized. Furthermore, the electrical system may be modified as necessary to accomplish the objectives stated herein.

When compressed air is available for the depositor 18 and air cylinder 299, an appropriate portion of dough or other tortilla ingredients is urged outward through orifice 293, separated by cutting blade 294, and deposited on the rear of lower compression plate 276 within the rearward end of tortilla pocket 280. The cutting blade 294 is in timed coordination with the tortilla scraper 278 and upper compression plate 290 to activate and separate the dough when the tortilla scraper 278 is at the rearward end of lower compression plate 276.

After receiving the ball of dough from depositor 18, the tortilla scraper 278 delivers the dough to the forward end of lower compression plate 276 beneath upper compression plate 290. As the tortilla scraper 278 moves forward to deliver the ball of dough, the forward end of tortilla pocket 280 urges the previously formed tortilla 11 off of the lower compression plate 276 onto first oven disc 22. It is to be understood that the continuous rotation of cam 230 coordinates the timed motion of upper compression plate 290 and tortilla scraper 278. That is, cam 230 permits the forward motion of tortilla scraper 278 as upper compression plate 290 moves upward or away from lower compression plate 276, and permits the rearward motion of tortilla scraper 278 as upper compression plate 290 moves downward or toward lower compression plate 276. Thus, the tortilla scraper 278 is able to continuously deposit a portion of dough or tortilla ingredients on the forward end of compression plate 276 between compression plates 276 and 290 upon the separation thereof and simultaneously remove the previously formed tortilla 11 from the forward end of compression plate 276 and deliver the formed tortilla to the first oven disc 22.

Upon removal from the forward end of lower compression plate 276, the formed tortilla 11 is received by the first oven disc 22. As the oven disc 22 rotates, as illustrated by the arrows in FIG. 1 and FIG. 2, a first side of the tortilla 11, in contact with the upper surface of oven disc 22, is partially toasted. Upon completion of one revolution of the first oven disc 22 with the tortilla 11 thereon, the tortilla 11 is removed therefrom by the flexible border 72 of fixed scraper 62. It is to be understood that the tortilla 11 will be removed or urged off of the rotating disc 22 as a result of the contact between the tortilla 11 and the border 72 and the simultaneous rotation of the disc 22. That is, the contact with border 72 and the simultaneous rotation of disc 22 causes the tortilla 11 to move to the outer periphery of disc 22 and slide off.

Upon removal of the tortilla 11 from the first oven disc 22, the tortilla is received by a fixed slide 23 which allows the tortilla 11 to turn over or upside down as it passes from the first disc 22 to the second disc 24. That is, as tortilla 11 slides off disc 22, it flips over as the second side thereof is received by and in contact with the arched or curved surface of slide 23. The second oven disc 24 thereafter receives the tortilla 11 after it slides down arched slide 23 and partially toasts the second side thereof as the oven disc 24 rotates. The scraper 62 having a horizontal border 72 and slide 23 thus combine to translate the tortilla 11 from a first toasting state on the first disc 22 on which a first side thereof is toasted to a second toasting state on the second disc 24 on which a second side thereof is toasted.

Upon completion of one revolution of the second disc 24 with the tortilla 11 thereon, the tortilla 11 is removed therefrom in the above described manner by a second scraper 64 having a flexible horizontal border 74 and the simultaneous rotation of disc 24. The tortilla 11 is thereafter received by a second fixed slide 25 and allowed to turn over in the manner described hereinabove as it passes from the second disc 24 to the third disc 26. The toasting of the first side of the tortilla 11 is thereafter completed on the third oven disc 26 as it rotates.

Upon completion of one revolution of the third oven disc 26, the tortilla 11 is removed therefrom in similar fashion by a fixed scraper 66 having a flexible border 76 and the simultaneous rotation of disc 26. The tortilla 11 is thereafter received by a third fixed slide 27 which allows the tortilla 11 to turn over in a similar fashion as described hereinabove as it passes from the third oven disc 26 to the fourth oven disc 28. The toasting of the second side of the tortilla 11 is thereafter completed on the fourth oven disc 28 as it rotates. The completely toasted tortilla 11 may be removed from the fourth oven disc 28 in a similar manner by a fixed scraper 68 having a flexible border 78 and the simultaneous rotation of disc 28, and thereafter be received by conveyor 20.

The toasting procedure within the oven 12 thus involves the translation of the tortilla 11 from a first toasting state on a first disc on which a first side thereof is toasted to a second toasting state on a second disc on which a second side thereof is toasted. It is to be understood, however, that any number of discs may be utilized provided that each side of the tortilla is partially or completely toasted at least once. Thus, a first side of the tortilla 11 may be completely toasted on first disc 22, the tortilla 11 may thereafter be translated to a second disc 24 adjacent to and in vertical alignment with the first disc 22 upon rotation of the first disc 22, and a second side of the tortilla 11 may be completely toasted on the second disc 24 prior to its removal therefrom. Furthermore, the formed tortilla 11 can be delivered to the first disc 22 by hand or other conventional fashion and be removed from second disc 24 by hand or other method without requiring the rotation of disc 24. Thus, the invention oven 12 disclosed herein may be utilized independent of the press 14, depositor 18, and/or conveyor 20. The size and positioning of the oven discs 22, 24, 26, and 28 further provide a compact tortilla oven 12 while providing extensive surface area upon which to continually toast a plurality of tortillas 11.

The method for toasting a tortilla 11 within the invention oven 10 comprises the steps of rotating and heating a first disc 22, toasting a first side of the tortilla 11 on the first disc 22, and translating the tortilla 11 from the first rotating disc 22 to a second disc 24 adjacent and in vertical alignment with the first disc 22. The method for toasting a tortilla further comprises the steps of rotating and heating the second disc 24, toasting a second side of the tortilla 11 on the second disc 24, and removing the tortilla 11 from the second disc 24. The method for toasting a tortilla may also further comprise the steps of translating the tortilla from the second rotating disc 24 to a third disc 26 adjacent to and in vertical alignment with the second disc 24, rotating and heating the third disc 26, toasting a first side of the tortilla on the third disc 26, translating the tortilla 11 from the third rotating disc 26 to a fourth disc 28 adjacent and in vertical alignment with the third disc 26, rotating and heating the fourth disc 28, toasting a second side of the tortilla 11 on the fourth disc 28, and removing the tortilla 11 from the fourth disc 28.

While the invention tortilla press and oven unit and method for toasting a tortilla therein has been described in connection with the preferred embodiment, it is not intended to limit the invention to the particular form set forth, but on the contrary, it is intended to cover such alternatives, modifications, and equivalents, as may be included within the spirit and scope of the invention as defined by the appended claims.

I claim:

1. A method for toasting a bakery product, comprising the steps of:
    (a) rotating and heating a first rotatable disc;
    (b) depositing said bakery product on said first disc;
    (c) toasting a first side of said bakery product on said first rotatable disc;
    (d) translating said bakery product from said first disc to a second rotatable disc, said translating step including the steps of removing said bakery product from said first disc and inverting said bakery product by means of a slide intermediate said first disc and said second disc, said slide receiving said bakery product from said first disc and allowing said bakery product to turn over upon translation thereof from said first disc to said second disc;
    (e) rotating and heating said second disc; and
    (f) toasting a second side of said bakery product on said second disc, said second disc adjacent to and in vertical alignment with said first disc.

2. A method for preparing a toasted bakery product, comprising the steps of:
    (a) forming said bakery product between a first compression plate for receiving a portion of bakery product ingredients thereon and a second compression plate movable with respect to said first compression plate;
    (b) delivering said formed bakery product to a first rotatable disc;
    (c) rotating and heating said first disc;
    (d) toasting a first side of said bakery product on said first disc;
    (e) translating said bakery product from said first disc to a second rotatable disc upon rotation of said first disc, said translating step including the steps of removing said bakery product from said first disc by means of a scraper and inverting said bakery product by means of a slide intermediate said first disc and said second disc, said slide receiving said bakery product from said first disc and allowing said bakery product to turn over upon translation thereof from said first disc to said second disc;
    (f) rotating and heating said second disc; and
    (g) toasting a second side of said bakery product on said second disc, said second disc adjacent to and in vertical alignment with said first disc.

3. A method for toasting a bakery product, as recited in claim 1, further comprising the step of removing said bakery product form said second disc.

4. A method for preparing a toasted bakery product, as recited in claim 2, further comprising the step of depositing said portion of bakery product ingredients on said first compression plate.

5. A method for toasting a bakery product, comprising the steps of:
    (a) rotating and heating a first oven disc rotatable in a horizontal plane through a complete revolution;
    (b) depositing said bakery product on said first oven disc;
    (c) toasting a first side of said bakery product on said first rotatable oven disc;
    (d) translating said bakery product from said first oven disc to a second oven disc rotatable in a horizontal plane through a complete revolution upon rotation of said first oven disc, said translating step including the steps of removing said bakery product from said first oven disc by means of a scraper and inverting said bakery product by means of a slide intermediate said first oven disc and said second oven disc, said slide receiving said bakery product from said furst oven disc and allowing said bakery product to turn over upon translation thereof from said first oven disc to said second oven disc;
    (e) rotating and heating said second oven disc; and
    (f) toasting a second side of said bakery product on said second oven disc, said second oven disc adjacent to and in vertical alignment with said first oven disc.

* * * * *